(12) United States Patent
Sumida

(10) Patent No.: US 8,379,680 B1
(45) Date of Patent: Feb. 19, 2013

(54) DIRECT COOLING OF THIN DISK LASERS

(75) Inventor: David Shuji Sumida, Malibu, CA (US)

(73) Assignee: The Boeing Company, Chicago, IL (US)

( * ) Notice: Subject to any disclaimer, the term of this patent is extended or adjusted under 35 U.S.C. 154(b) by 800 days.

(21) Appl. No.: 12/538,436

(22) Filed: Aug. 10, 2009

(51) Int. Cl.
*H01S 3/04* (2006.01)

(52) U.S. Cl. .................. 372/36; 372/35; 372/34; 372/7

(58) Field of Classification Search .............. 372/6, 35, 372/34, 7, 36
See application file for complete search history.

(56) References Cited

U.S. PATENT DOCUMENTS

| | | | |
|---|---|---|---|
| 5,553,088 A | 9/1996 | Brauch et al. | |
| 5,761,233 A | 6/1998 | Bruesselbach et al. | |
| 6,347,109 B1 | 2/2002 | Beach et al. | |
| 6,600,763 B2 | 7/2003 | Ludewigt | |
| 7,308,014 B2 | 12/2007 | Eisenbarth et al. | |
| 2004/0042524 A1* | 3/2004 | Kafka et al. | 372/75 |
| 2005/0094689 A1* | 5/2005 | Ludewigt | 372/36 |
| 2006/0083276 A1* | 4/2006 | Brown | 372/36 |
| 2008/0304534 A1 | 12/2008 | Sumida et al. | |
| 2009/0059991 A1 | 3/2009 | Bossert et al. | |

\* cited by examiner

*Primary Examiner* — Kinam Park
(74) *Attorney, Agent, or Firm* — Ostrager Chong Flaherty & Broitman P.C.

(57) ABSTRACT

The present embodiment provides a thin disk laser disk element having improved direct cooling through the use of a barrier material directly attached to the high reflectivity layer of the thin disk element. This barrier is needed due to noticeable degradation of the reflectivity of the thin disk element without the barrier material. A barrier material of sapphire (crystalline $Al_2O_3$) is preferable, given a desire to have adequate thermal conductivity through the barrier material, proper matching of the coefficient of thermal expansion with the other components of the thin disk, and to save monetary costs. In another preferred embodiment, an intermediate layer is interposed between the thin disk element and the barrier material to provide improved adhesion between the barrier material and the thin disk element. Preferred crystallographic orientations for sapphire barrier material are provided as well.

21 Claims, 6 Drawing Sheets

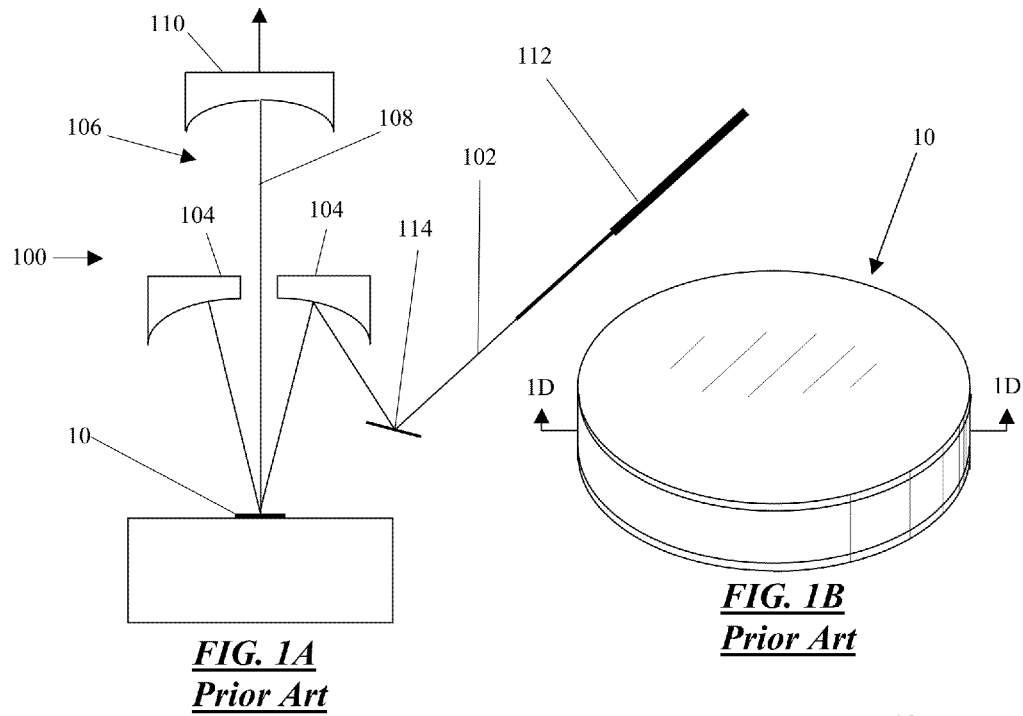
FIG. 1A
*Prior Art*
FIG. 1B
*Prior Art*
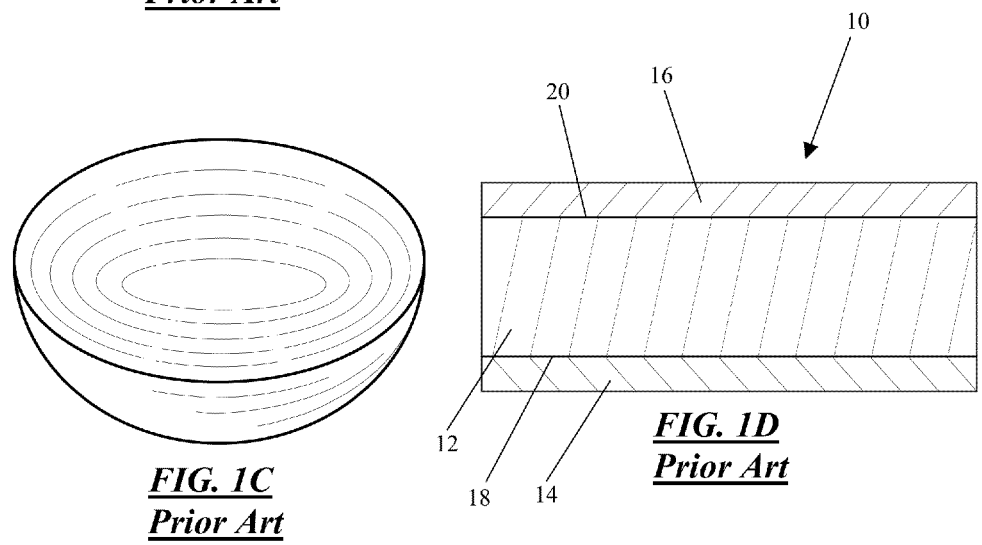
FIG. 1C
*Prior Art*
FIG. 1D
*Prior Art*

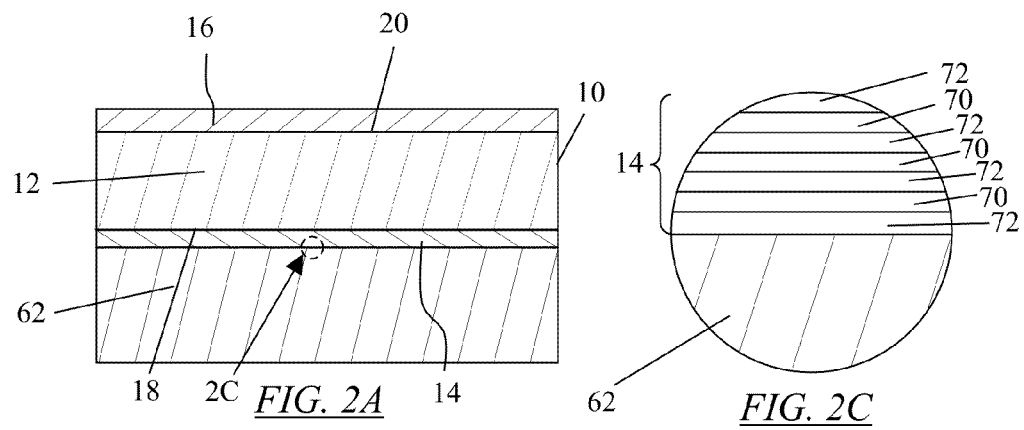
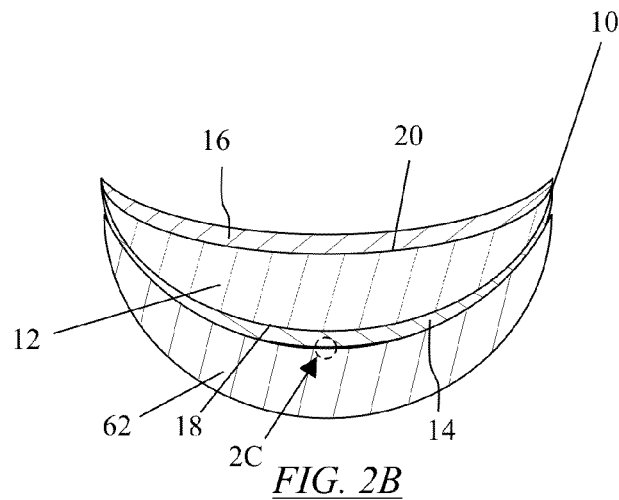

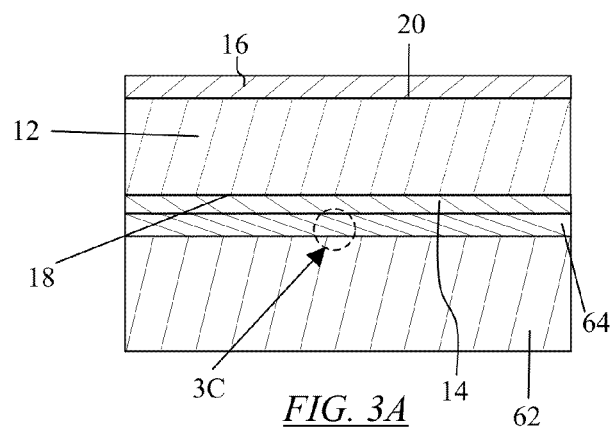
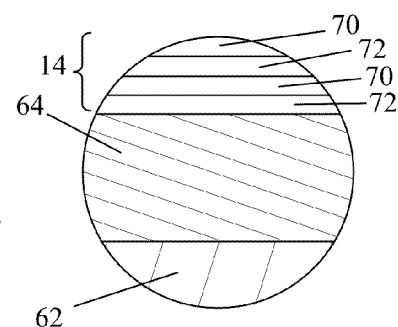
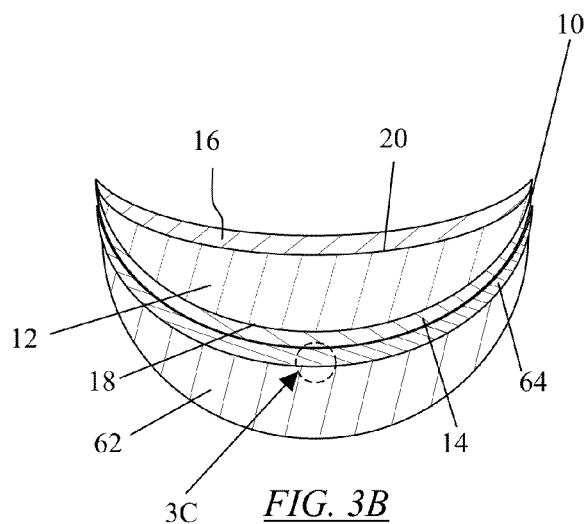

DIRECT COOLING OF THIN DISK LASERS

CROSS-REFERENCE TO RELATED APPLICATIONS

This application is related to U.S. patent application Ser. No. 11/760,470, entitled "Power Scalable Thin Disk Lasers," the specification of which is incorporated herein by reference.

TECHNICAL FIELD

The present disclosure relates generally to improved methods of cooling thin disk lasers, and more particularly to an improved thin disk laser assembly utilizing a protective barrier to prevent the high reflectivity coating of a thin disk laser from degrading during liquid cooling.

BACKGROUND

A thin disk laser is a laser whose laser active medium is a thin disk element. Thin disk lasers generally comprise a thin disk element, usually crystal, and an optical resonator cavity, which includes end mirrors and a partially reflective mirror, used as the output coupler. Typically, the thin disk element is approximately a few tenths of a millimeter to a few millimeters in thickness. One flat side of the disk element has a highly reflective (HR) layer, while the opposite flat side has an anti-reflectivity (AR) layer.

To achieve population inversion, the thin disk element is optically pumped with light of an appropriate wavelength, which is incident on the flat surface of the side of the disk element having the anti-reflectivity layer. As the disk element is very thin, a relatively low percentage of pump light is absorbed after one pass. Therefore, unabsorbed pump light is repeatedly reflected back towards the thin disk by a series of reflective optical elements, thereby achieving sufficient pump light absorption. Emitted laser light resonates within an optical resonator cavity, thereby amplifying the laser light, some of which is passed through a partially reflective output coupler. As both laser light and pump light must be reflected by the thin disk element, the highly reflective layer on the thin disk element must be reflective with respect to both the pump light wavelength and the laser light wavelength. The anti-reflectivity layer likewise must have minimal reflectivity at both the pump and laser wavelength.

Laser resonator cavities can be constructed in many ways, and generally comprise a series of optically reflective elements aligned in such a way as to allow multiple passes of laser light and pump light over the thin disk element. Examples of laser optical cavity resonators can be seen in the following patents: U.S. Pat. Nos. 6,347,109 and 7,308,014.

Typically, cooling is required for the thin disk element. It is preferable to cool from the side having the high-reflectivity coating (the bottom or back side), since laser light and pump light are both incident on the side having the anti-reflectivity coating. Cooling from the bottom side allows use of a cooling structure with no optical requirements.

A very effective method of cooling the high reflectivity surface is liquid cooling. However, liquid cooling applied directly against the HR coating tends to degrade the reflectivity performance of the high reflectivity coating as the liquid coolant physically degrades the thin, sensitive material of the HR layer. Some sort of barrier material is therefore necessary to prevent degradation of the HR layer.

One prior attempt at a solution to the problem of degradation of the high reflectivity coating during liquid cooling is the use of hard durable coatings deposited by ion-beam sputtering (IBS). However, our tests have shown that this method is insufficient to properly protect the HR coating against degradation, as measurable degradation was noticed after only approximately 40 hours of cooling.

Another prior attempt at a solution to the problem of degradation of the high reflectivity coating during liquid cooling is to use a thick protective material such as synthetic diamond made by chemical vapor deposition (CVD), glued to the HR stack. This provides some protection for the HR coating, with excellent thermal conductivity, but there is a severe mismatch in the coefficient of thermal expansion between the diamond, the YAG active laser material, and the HR coating. This mismatch prevents the CVD diamond solution from use over a large range of coolant temperatures, and may prevent, for example, its use with a cryogenic coolant.

Thus there is a need for long-term protection against degradation caused by liquid cooling of the bottom side of thin disk elements, while providing good thermal conductivity for effective cooling, as well as good coefficient of thermal expansion (CTE) matching, thereby allowing operation over a large coolant temperature range.

SUMMARY

The present disclosure provides for a first exemplary embodiment of a thin disk element having a barrier material attached to the HR layer, providing protection of the high-reflectivity layer of the thin disk element against impinging liquid coolant, while providing good thermal conductivity and the ability to operate over a large range of coolant temperatures. A second exemplary embodiment provides improved adhesion of the barrier material to the HR layer as compared with the first embodiment.

Accordingly, in one exemplary embodiment, a thin disk element with protective coolant barrier comprises: a laser gain material disk with a top side and a bottom side; an anti-reflection (AR) coating layer on the top side of the gain material disk; a high-reflectivity (HR) coating layer on the bottom side of the gain material disk; and a protective barrier material covering the high-reflectivity coating layer; wherein the protective barrier material has a coefficient of thermal expansion which closely matches that of the other materials of the thin disk element.

In a second exemplary embodiment, a thin disk element with protective coolant barrier comprises: a laser gain material disk with a top side and a bottom side; an anti-reflection (AR) coating layer on the top side of the gain material disk; a high-reflectivity (HR) coating layer on the bottom side of the gain material disk; a protective barrier material covering the high-reflectivity coating layer; and an intermediate layer situated between the HR layer and the protective barrier material, for improved adhesion and durability.

A more complete understanding of the novel thin disk laser embodiments disclosed herein will be afforded to those skilled in the art, as well as a realization of additional advantages thereof, by a consideration of the following detailed description of one or more exemplary embodiments, particularly if considered in conjunction with the appended drawings, wherein like reference numerals are used to identify like elements illustrated in one or more of the figures thereof.

BRIEF DESCRIPTION OF THE DRAWINGS

FIG. 1A is a schematic view of a prior art thin disk laser.

FIG. 1B is a perspective view of a planar prior art thin disk element for use in a thin disk laser.

FIG. 1C is a perspective view of a curved prior art thin disk element for use in a thin disk laser.

FIG. 1D is a cross-sectional view of a prior art thin disk element for use in a thin disk laser, taken along lines 1D-1D of FIG. 1B.

FIG. 2A is a cross-sectional view of a first embodiment of a planar thin disk element with protective barrier material, taken along lines 2A-2A of FIG. 4B.

FIG. 2B is a cross-sectional view of a first embodiment of a curved thin disk element with protective barrier material, taken along lines 2B-2B of FIG. 5A.

FIG. 2C is a close up schematic view showing the point of attachment between the barrier material and the high reflectivity layer in a first embodiment of a thin disk element.

FIG. 3A is a cross-sectional view of a second embodiment of a planar thin disk element with protective barrier material and intermediate layer, taken along lines 3A-3A of FIG. 4D.

FIG. 3B is a cross-sectional view of a second embodiment of a curved thin disk element with protective barrier material and intermediate layer, taken along lines 3B-3B of FIG. 5B.

FIG. 3C is a close up view showing the point of attachment between the barrier material, the high reflectivity layer and the intermediate layer in a second embodiment of a thin disk element.

DETAILED DESCRIPTION OF THE PREFERRED EMBODIMENTS

Figure 4A:
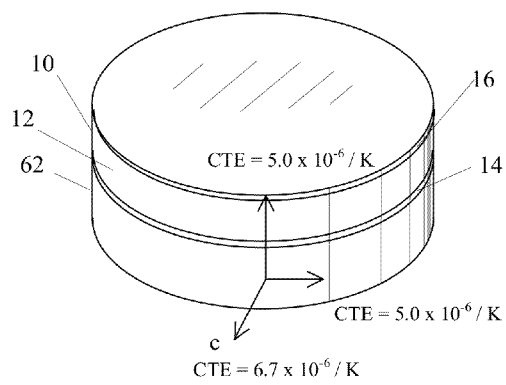
FIG. 4A is a perspective view of a first embodiment of a planar thin disk element showing a first preferred crystallographic orientation for a barrier material of crystalline sapphire.
Figure 4B:
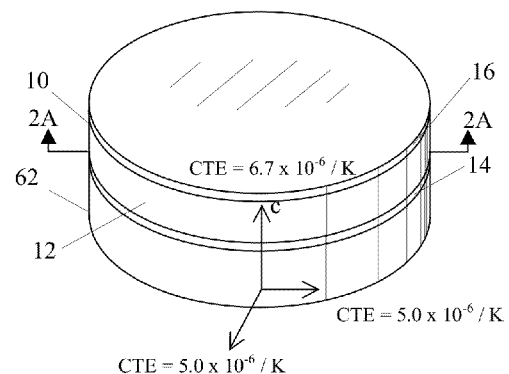
FIG. 4B is a perspective view of a first embodiment of a planar thin disk element showing a second preferred crystallographic orientation for a barrier material of crystalline sapphire.

In the following detailed description, certain preferred embodiments are described as illustrations in a specific application environment in order to provide a thorough understanding of the present disclosure. Those methods, procedures, components, or functions which are commonly known to persons of ordinary skill in the field of the disclosure are not described in detail so as not to unnecessarily obscure a concise description of the present disclosure. Certain specific embodiments or examples are given for purposes of illustration only, and it will be recognized by one skilled in the art that the teachings of this disclosure may be practiced in other analogous applications or environments and/or with other analogous or equivalent variations of the illustrative embodiments.

Referring to FIGS. 1A-1D, the general compositions of a thin disk laser 100 and a thin disk element 10 are shown. FIG. 1B depicts a planar embodiment of a thin disk element and FIG. 1C depicts a curved embodiment of a thin disk element. A single specific embodiment of a thin disk laser is shown in FIG. 1A, but a large number of configurations for such lasers are known. As seen in FIGS. 1A and 1D, which is a cross-section of a thin disk element, taken along lines 1D-1D of FIG. 1B, a thin disk laser is a laser whose gain is provided by a thin reflecting disk 10, containing gain medium 12 (a laser gain material disk), said gain medium having opposing top 20 and bottom 18 surfaces. To achieve population inversion, the gain medium 12 is optically pumped by pump light 102 which is directly incident on the top surface 20 of the gain medium 12. Pump light 102 is directed towards the disk 10 by optical fiber 112 and input coupling mirror 114. A thin disk of the type described herein is available from TRUMPF Laser of Ditzingen, Germany.

As the disk 10 is generally very thin, usually on the order of approximately 100 microns, pump light 102 must make multiple passes to achieve an appropriate absorption level. Unabsorbed pump light is therefore reflected by a series of mirrors 104 back onto the thin disk. Laser light is emitted into a resonator cavity 106, which comprises an output coupler (partially reflective mirror) 110, and a 100% reflective end mirror, i.e. the HR coating on the back surface of disk 10, which reflect laser light back towards the gain medium 12, thereby producing an oscillating beam 108. The laser light passes out of the resonator, through the output coupler 110. Optionally, the resonator cavity may include additional optically reflective elements, including end mirrors which are not partially reflective.

As shown in FIG. 1D, for best operation, the top surface 20 of the gain medium 12 has an anti-reflectivity (AR) coating or layer 16. The anti-reflectivity coating is operable at both pump and laser light wavelengths. To give the disk 10 reflective properties, the bottom surface 18 of the gain medium 12 has a highly reflective (HR) coating 14, which is suited for both pump and laser light wavelengths. The highly reflective coating may be deposited onto the active laser element 12 via many different deposition processes including thermal evaporation, ion beam sputtering, or other known techniques.

The gain medium 12 of the thin disk 10 is preferably composed of ytterbium (Yb) doped yttrium aluminum garnet (YAG) disks. Alternatively, the gain medium may be composed of ytterbium (Yb) doped with any of the following materials: $Sc_2O_3$, $LuVO_4$, $KGd(WO_4)_2$, $YVO_4$, $Lu_2O_3$, $LaSc_3(BO_3)_4$, or $KY(WO_4)_2$. These other materials may be used to vary properties of the active laser element 12 such as absorption cross section, quenching effects, and thermal conductivity. Alternatively, other laser gain media besides Yb may be used, such as neodymium (Nd), thulium (Tm), holmium (Ho), and chromium (Cr). The disk 10 preferably has a planar or concave curvature, but may have other types of curvature.

Figure 6:
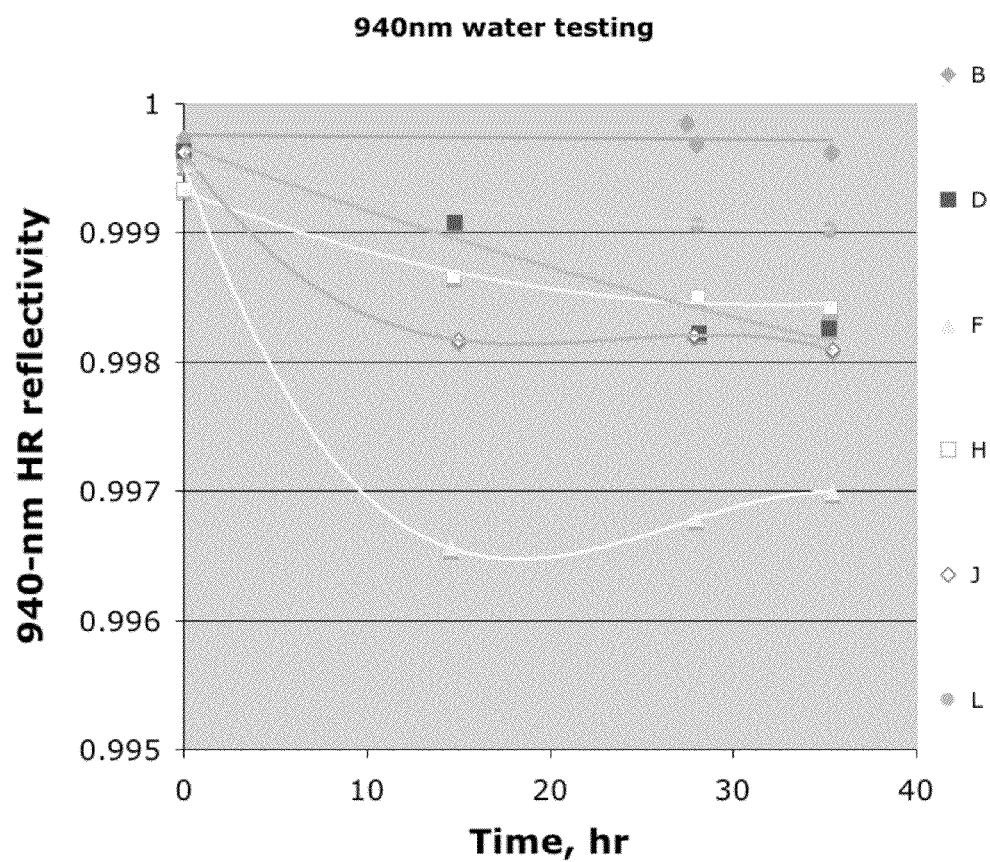
FIG. 6 is a graph showing HR layer degradation during liquid cooling of a thin disk, without the improvements described herein.

As the thin disk element 10 is very thin, heat is drawn from a direction perpendicular to the plane of the disk 10. It is preferable to cool from the bottom side 18 of the disk 10, as this obviates any optical requirements for a cooling device. Heat is therefore drawn through the highly reflective coating 14 of the disk. A very effective cooling method is liquid cooling. However, a liquid coolant, when directly impinging on the disk 10, degrades the reflectivity performance of the highly reflective coating 14. FIG. 6 is a graph of time vs. reflectivity of the HR coating at a wavelength of 940 nm, and depicts six trials of a test of degradation of the HR coating during liquid cooling. Samples B, F, and J serve as baseline measurements in which no protective layers of any kind were disposed over the HR stack. For the other three samples, (D, H, and L), a thin film of $Al_2O_3$ was disposed over the HR stack. As can be seen in the figure, all six of the samples show noticeable degradation of the HR stack after only 40 hours of cooling wherein, on average, the first group without a protective coating degraded more than the average degradation of the second group (D, H, and L). Hence, these data indicate that the $Al_2O_3$ overcoat was not sufficient to protect the HR stack from degradation.

As depicted in FIGS. 2A (depicting a planar embodiment of a thin disk), 2B (depicting a curved embodiment of a thin disk), 4A-4B (depicting a planar embodiment of a thin disk) and 5A (depicting a curved embodiment of a thin disk), therefore, a liquid cooled thin disk would benefit from having a mechanical barrier 62 interposed between the liquid coolant and the HR coating. To be effective, such a mechanical barrier must have certain properties, as follows: 1) maximum possible thermal conductivity; 2) mechanical robustness and ability to prevent liquid coolant from impinging on and degrading the HR coating; and 3) matching of coefficient of thermal expansion (CTE) of the barrier material with the rest of the disk, to a certain degree (within a factor of 10-20% is preferable and within a factor of 2 is acceptable, depending on the application). Further, it is preferable that the barrier material itself and the method of bonding the barrier material to the thin disk are low in monetary cost.

For the thin disk gain material of ytterbium (Yb) doped yttrium aluminum garnet (YAG) disks, a preferable material which meets the criteria described above is crystalline sapphire (chemical composition $Al_2O_3$). The barrier material 62 should be disk shaped, to correspond to the thin disk element 10, and should be directly attached to the HR coating 14 using diffusion bonding. Appropriate sapphire barrier materials and attachment procedures are available from ONYX Optics of Dublin, Calif., USA.

Sapphire has good thermal conductivity, which is approximately 33-35 W/mK, and this conductivity is relatively insensitive to its crystallographic orientation. (David N. Nikogosyan, Properties of Optical and Laser-Related Materials, p. 2 [1997]). For the preferred barrier thickness of approximately 100 microns, the temperature drop across the barrier will be approximately 18K, which will permit sufficient cooling.

Although a figure of 100 microns is given for the thickness of the barrier, this is simply an optimal figure given the state of current technology and the fact that monetary costs must be kept to a reasonable level. It should be recognized that the barrier material would optimally be as thin as possible, as temperature drop is directly proportional to thickness of the material. A brief description of the manufacturing process should illuminate the practical difficulties associated with forming a barrier material of arbitrary thinness.

During manufacture, it is preferable to attach a thick barrier substrate material to the thin disk element and subsequently polish the barrier material down to a required thickness. During this polishing process, the surface being polished must be parallel to the plane defined by the interface between the thin disk and the barrier material to ensure uniform thickness and therefore uniform cooling through the barrier. However, the manufacturing process has a parallelism tolerance. A variation of 1 micron thickness from one side of the barrier to the other, for example, represents a fraction of only 1% if the barrier is 100 microns, but represents 10% if the barrier is only 10 microns thick. Since a tighter parallelism tolerance is increasingly expensive, a figure of 100 microns for the barrier thickness represents a good balance between cost and cooling effectiveness, given the current state of manufacturing technology. However, this figure should be taken to be merely illustrative, and not limiting, since as stated above, the barrier material would optimally be as thin as possible.

Referring now to FIG. 2C, which is a close-up of the area enclosed in the dotted circle in FIGS. 2A and 2B, the preferred configuration of the bond between the barrier material 62 and the thin disk 10 is now described. As described above, the barrier material 62 should be attached to the high reflectivity (HR) coating layer 14 of the thin disk 10. Standard high reflectivity coating is comprised of alternating layers of $Ta_2O_5$ 72 and $SiO_2$ 70. As $Ta_2O_5$ layers 72 are physically and chemically more compatible with $Al_2O_3$, than $SiO_2$ layers 70, it is preferable to ensure that a layer of Ta2O5 72 is the bottom-most layer and is therefore attached to the barrier material 62, as shown in FIG. 2C. For different chemical compositions of HR layers (i.e. HR layers not composed of alternating layers of $Ta_2O_5$ and $SiO_2$), it should be ensured that the layer that is attached to the barrier material is the layer which is the most physically and chemically compatible with the material of the barrier 62 Therefore, the sapphire barrier material 62 is preferably diffusion bonded to a $Ta_2O_5$ layer 72 of the HR coating layer 14.

Referring now to FIGS. 3A-3C, 4C-4D and 5B, increased integrity of the bond between the barrier material 62 and the thin disk 10 can be provided in a second preferred embodiment, with the addition of an intermediate layer 64 directly interposed between the barrier 62 and the HR layer 14. The intermediate layer 64 should provide good CTE matching with the rest of the disk (within a factor of 10-20% is preferable and within a factor of 2 is acceptable, depending on the application) and good thermal conductivity. The intermediate layer 64 should also be able to form a strong bond with both the HR layer and the barrier material 62.

One way to ensure a very strong bond between the intermediate layer 64 and the barrier material 62 is to use an intermediate material which has the same chemical composition as the barrier material. For example, if the preferred material of sapphire (crystalline $Al_2O_3$) is chosen for the barrier 62 material, then a preferable choice for the intermediate layer is amorphous $Al_2O_3$. Other choices can be made for the substrate and intermediate layer material as appropriate. For example, with regard to the substrate material $Al_2O_3$, intermediate layers that are single-crystalline or poly-crystalline may be better from a physicochemical perspective, given that such crystalline structures would better align crystallographically to the substrate, and therefore be subject to fewer inclusions and defects during the deposition growth. One reported method for deposition of crystalline thin films is pulsed laser deposition (PLD). It should be understood that there may be choices of intermediate layer materials that provide as good or better structural bonding and have as good or better thermo-mechanical characteristics (CTE and thermal conductivity) as opposed to choosing a material with the same chemical composition as the barrier material. The materials mentioned above are for purposes of illustration. Any combination of intermediate layer and barrier material that provides the desired thermo-mechanical characteristics may be used.

In accordance with this second preferred embodiment, a thin film of $Al_2O_3$ is preferably deposited onto the HR layer via ion beam sputtering. Preferably, as in the first embodiment and shown for the second embodiment in FIG. 3C, for a standard HR layer 14 composed of alternating $SiO_2$ 70 and $Ta_2O_5$ 72 layers, the intermediate layer thin film of $Al_2O_3$ 64 is deposited onto the bottom most layer of $Ta_2O_5$ 72 of the HR layer 14. This bond configuration is preferred, as $Al_2O_3$ is more physically and chemically compatible with $Ta_2O_5$ than $SiO_2$.

A thin film of this type has a thickness of approximately 1 micron, and has a thermal conductivity of approximately 0.007 W/mK (Lambropolous et al, J. Appl. Phys. 66 4230 [1989]), which means that the temperature drop across this film will be approximately 10K. Although this is a large figure compared to the figure of 18K for a barrier material 62 of crystalline sapphire having a thickness of 100 microns, the drop in cooling effectiveness will still allow an appropriate amount of cooling, and this thickness of thin film may be needed to ensure adequate bond strength over a large range of operating temperatures. For those materials whose laser gain are relatively more temperature sensitive, the additional temperature drop due to the intermediate layer in the embodiment of the improved direct cooling thin disk having the intermediate layer (second preferred embodiment) may be disadvantageous for efficient laser operation, given the same coolant temperature. In those cases, it is preferable not to use an intermediate layer. However, for those materials that are relatively more temperature sensitive and for which the coolant temperature can be reduced, lower coolant temperature would provide more efficient laser operation. In that case, the mechanical robustness of the barrier material is of primary concern and overrides the previous concern regarding the small additional temperature drop from the intermediate layer. Hence, the inclusion of an intermediate layer may be preferable.

A choice of a thin film of amorphous $Al_2O_3$ for the intermediate layer 64 is also advantageous in that it has a coefficient of thermal expansion of approximately $8.2 \times 10^{-6}$/K (Thielsch et al, Applied Optics, 41, p. 321 [2001]), which reasonably matches the CTE of the preferred gain material (YAG, which has a CTE of between $6.7 \times 10^{-6}$/K and $7.7 \times 10^{-6}$/K), and the barrier material, both parallel to the c-axis (CTE of $6.7 \times 10^{-6}$/K) and perpendicular to the c-axis (CTE of $5.0 \times 10^{-6}$/K).

Referring now to FIGS. 4A-4D, two different preferred crystallographic orientations for the sapphire barrier material 62 bonded to a thin disk 10 are shown. These crystallographic orientations can be used with either the first (without an intermediate layer—FIGS. 4A and 4B) or second (with an intermediate layer—FIGS. 4C and 4D) preferred embodiments. Crystalline sapphire is anisotropic, the c-axis having different thermo-mechanical properties than the b-axis or a-axis. Regarding the coefficient of thermal expansion (CTE) of sapphire, the c-axis has a different CTE than the a-axis and the b-axis, which both have the same CTE. Namely, the CTE of sapphire in the direction parallel to the c-axis is $6.7 \times 10^{-6}$/K, while the CTE in directions perpendicular to the c-axis is $5.0 \times 10^{-6}$/K. (See Nikogosyan, p. 2).

Figure 4C:
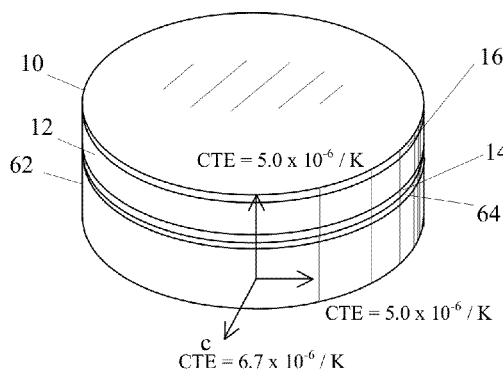
FIG. 4C is a perspective view of a second embodiment of a planar thin disk element, including an intermediate layer, in which is shown a first preferred crystallographic orientation for a barrier material of crystalline sapphire.
Figure 4D:
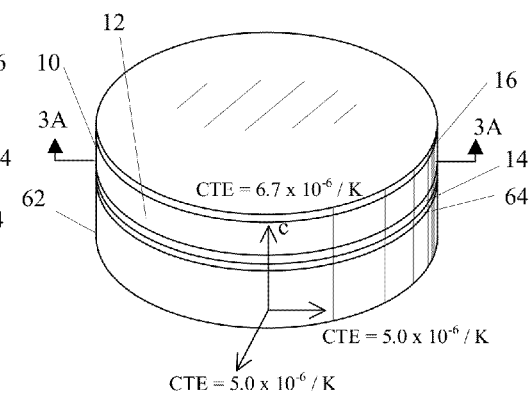
FIG. 4D is a perspective view of a second embodiment of a planar thin disk element, including an intermediate layer, in which is shown a second preferred crystallographic orientation for a barrier material of crystalline sapphire.
Figure 5A:
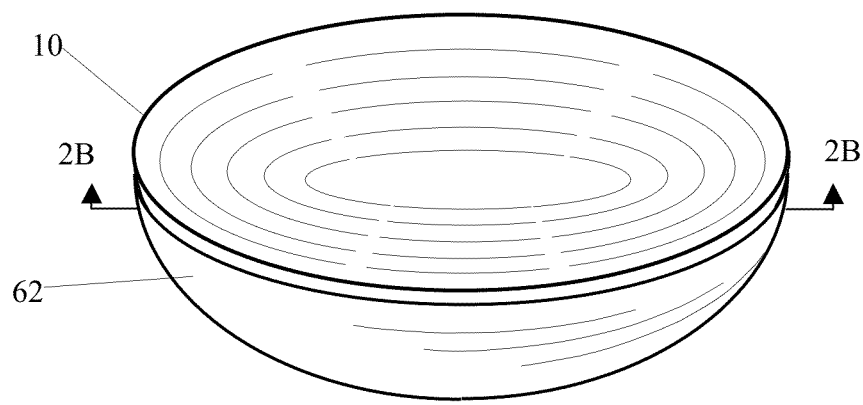
FIG. 5A is a perspective view of a first embodiment of a curved thin disk element.
Figure 5B:
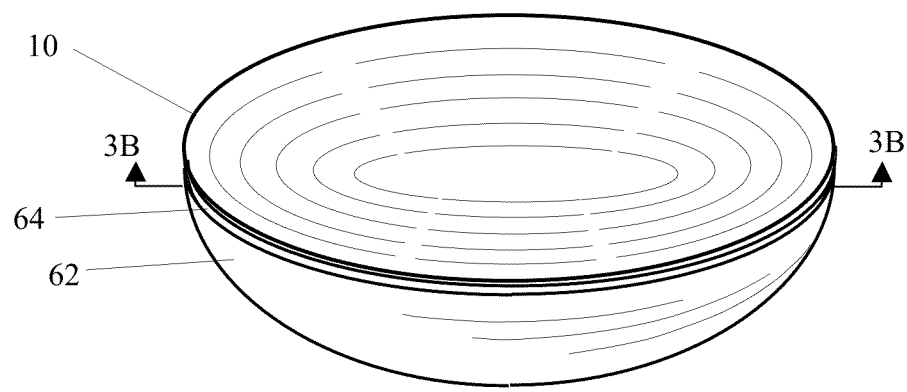
FIG. 5B is a perspective view of a second embodiment of a curved thin disk element, including intermediate layer.

With the goal of CTE matching in mind, note that the higher value of $6.7 \times 10^{-6}$/K best matches the rest of the disk. The YAG gain material has a CTE of between $6.6 \times 10^{-6}$/K and $7.7 \times 10^{-6}$/K. (Nikogosyan, p. 19), and the CTE for a thin film of $Al_2O_3$ deposited via ion beam sputtering, as used in the second preferred embodiment, is approximately $8.2 \times 10^{-6}$/K (Thielsch et al, Applied Optics, 41, p. 321 [2001]). Therefore, as shown in FIGS. 4A and 4C, best CTE matching is obtained by having the preferred orientation of the sapphire barrier be with the c-axis parallel to the plane defined by the HR coating layer. Either preferred crystallographic orientation can be used in conjunction with the curved thin disk embodiments depicted in FIGS. 5A and 5B.

However, with the c-axis parallel to the plane defined by the HR coating layer, the plane of the barrier material will expand and contract unevenly with heating or cooling, as the plane of the barrier material has a CTE of $6.7 \times 10^{-6}$/K in one direction and $5.0 \times 10^{-6}$/K in another direction. This will cause mechanical stresses on the barrier material due to the bond with the rest of the thin disk. Therefore, in an alternative embodiment, shown in FIGS. 4B and 4D, the preferred orientation of the c-axis is perpendicular to the plane defined by the HR coating. This allows the disk to expand and contract evenly in the plane of the barrier, thereby avoiding the anisotropic mechanical stresses in the plane of the coating, but introducing a larger CTE mismatch than in the former case. The best mode of crystallographic orientation will need to be determined for each individual situation.

Again, it should be understood that this specification should not be read to limit to the specific materials listed and described herein. Choice of materials can be made by considering several factors, listed above, which again are: 1) thermal conductivity; 2) CTE matching with the rest of the disk, 3) mechanical robustness and ability to protect against impinging liquid coolant, and 4) monetary cost. Any material that meets the appropriate characteristics may be used for the barrier material, either attached directly to the HR layer of the thin disk, or attached to an intermediate layer which is attached to the HR layer.

Many modifications and variations may of course be devised given the above description of the principles of the disclosure. It is intended that all such modifications and variations be considered as within the spirit and scope of this disclosure, as defined in the following claims.

I claim:

1. A thin disk element with protective coolant barrier comprising:
    a laser gain material disk with a top side and a bottom side;
    an anti-reflection (AR) coating layer on the top side of the gain material disk;
    a high-reflectivity (HR) coating layer on the bottom side of the gain material disk;
    a protective barrier material covering the high-reflectivity coating layer; and
    an intermediate layer positioned between the HR layer and the protective barrier material.

2. The thin disk element of claim 1, wherein:
    the protective barrier material is crystalline sapphire ($Al_2O_3$); and
    the intermediate layer is a thin film of amorphous $Al_2O_3$ deposited onto the HR layer.

3. The thin disk element of claim 1, wherein:
    the protective barrier material is crystalline sapphire ($Al_2O_3$); and
    the intermediate layer is a thin film of polycrystalline $Al_2O_3$.

4. The thin disk element of claim 1, wherein:
    the protective barrier material is crystalline sapphire ($Al_2O_3$); and
    the intermediate layer is a thin film of single crystalline $Al_2O_3$.

5. The thin disk element of claim 1, wherein:
    the HR layer has a top side and a bottom side, the top side being attached to the laser gain material disk;
    the HR layer comprises alternating layers of $Ta_2O_5$ and $SiO_2$, and has a bottom-most layer of $Ta_2O_5$ exposed at the bottom side of the HR layer; and
    the intermediate layer is attached to the $Ta_2O_5$ layer exposed at the bottom side of the HR layer.

6. The thin disk element of claim 1, wherein:
    the protective barrier material has a thickness within the approximate range of 10-100 microns; and
    the intermediate layer has a thickness on the order of 1 micron.

7. The thin disk element of claim 1, wherein:
the substrate is bonded to the intermediate layer via anodic bonding.

8. The thin disk element of claim 2, wherein:
the intermediate layer defines a plane of attachment between the intermediate layer and the protective barrier material; and
the crystalline sapphire of the protective barrier material has a crystallographic orientation wherein the c-axis orientation is perpendicular to the plane of attachment.

9. The thin disk element of claim 2, wherein:
the intermediate layer defines a plane of attachment between the intermediate layer and the protective barrier material; and
the crystalline sapphire of the protective barrier material has a crystallographic orientation wherein the c-axis orientation is parallel to the plane of attachment.

10. The thin disk element of claim 1, wherein:
the intermediate layer and the barrier material both have coefficients of thermal expansion which closely match the rest of the thin disk element.

11. The thin disk element of claim 1, wherein:
the thin disk is planar.

12. The thin disk element of claim 1, wherein:
the thin disk is curved.

13. A thin disk element with protective coolant barrier comprising:
a laser gain material disk with a top side and a bottom side;
an anti-reflection (AR) coating layer on the top side of the gain material disk;
a high-reflectivity (HR) coating layer on the bottom side of the gain material disk;
a protective barrier material comprising crystalline sapphire ($Al_2O_3$) covering the high-reflectivity coating layer; and
an intermediate thin film of amorphous $Al_2O_3$ deposited onto the HR layer between the HR layer and the protective barrier material.

14. The thin disk element of claim 13, wherein:
the protective barrier material has a thickness within the approximate range of 10-100 microns; and
the intermediate layer has a thickness on the order of 1 micron.

15. The thin disk element of claim 13, wherein:
the intermediate layer defines a plane of attachment between the intermediate layer and the protective barrier material; and
the crystalline sapphire of the protective barrier material has a crystallographic orientation wherein the c-axis orientation is perpendicular to the plane of attachment.

16. The thin disk element of claim 13, wherein:
the intermediate layer defines a plane of attachment between the intermediate layer and the protective barrier material; and
the crystalline sapphire of the protective barrier material has a crystallographic orientation wherein the c-axis orientation is parallel to the plane of attachment.

17. The thin disk element of claim 13, wherein:
the intermediate layer and the barrier material both have coefficients of thermal expansion which closely match the rest of the thin disk element.

18. A thin disk element with protective coolant barrier comprising:
a laser gain material disk with a top side and a bottom side;
an anti-reflection (AR) coating layer on the top side of the gain material disk;
a high-reflectivity (HR) coating layer on the bottom side of the gain material disk;
a protective barrier material covering the high-reflectivity coating layer and having a coefficient of thermal expansion which closely matches a coefficient of thermal expansion of the laser gain material disk; and
an intermediate thin film layer positioned between the HR layer and the protective barrier material and having a coefficient of thermal expansion which closely matches the coefficient of thermal expansion of the laser gain material disk.

19. The thin disk element of claim 18, wherein:
the protective barrier material is crystalline sapphire ($Al_2O_3$); and
the intermediate layer is a thin film selected from the group consisting of amorphous $Al_2O_3$, polycrystalline $Al_2O_3$ and single crystalline $Al_2O_3$.

20. The thin disk element of claim 19, wherein:
the intermediate layer defines a plane of attachment between the intermediate layer and the protective barrier material; and
the crystalline sapphire of the protective barrier material has a crystallographic orientation wherein the c-axis orientation is perpendicular to the plane of attachment.

21. The thin disk element of claim 19, wherein:
the intermediate layer defines a plane of attachment between the intermediate layer and the protective barrier material; and
the crystalline sapphire of the protective barrier material has a crystallographic orientation wherein the c-axis orientation is parallel to the plane of attachment.

* * * * *